United States Patent [19]

Schefers et al.

[11] Patent Number: 4,910,906
[45] Date of Patent: Mar. 27, 1990

[54] METHOD AND APPARATUS FOR MAINTAINING AN OPENING IN OUTDOOR ICE

[76] Inventors: Herbert F. Schefers, Rte. 5, Box 208, Pierz, Minn. 56364; James O. Schefers, Rte. 3, Foley, Minn. 56329

[21] Appl. No.: 305,915

[22] Filed: Jan. 30, 1989

[51] Int. Cl.[4] .............................................. A01K 00/00
[52] U.S. Cl. ............................................. 43/4; 43/4.5; 114/345
[58] Field of Search ............... 43/4, 4.5, 41; 441/30, 441/40, 44, 66, 114.54, 114.27 X, 111; 405/217, 68; 114/345 X

[56] References Cited

U.S. PATENT DOCUMENTS

| | | | |
|---|---|---|---|
| 3,798,911 | 3/1974 | Oberg | 405/69 |
| 4,104,884 | 8/1978 | Preus | 405/68 |
| 4,218,840 | 8/1980 | Cohee | 43/4 |
| 4,294,030 | 10/1981 | Stewart | 43/4 |
| 4,462,331 | 7/1984 | McCrory | 114/345 |
| 4,761,909 | 8/1988 | Christian et al. | 43/4 |

OTHER PUBLICATIONS

Perma-Hole Sales literature.

*Primary Examiner*—Nicholas P. Godici
*Assistant Examiner*—Michael William Starkweather

[57] ABSTRACT

A method and apparatus using a pressurizable bladder for maintaining a hole open in outdoor ice atop a body of water. The apparatus has a top plug with an air tube and valve, an elongate bladder extending down from the plug, and radially spaced apart longitudinal cords in the bladder which constrains elongate growth but enable diameter growth of the bladder. The method has steps of placing the ice plug over a hole, weighing the ice plug, inflating the bladder to a pressure of about 2-3 PSIG, and restraining the ice plug in the hole with a diametrically expanded lower part of the bladder underneath the ice.

25 Claims, 1 Drawing Sheet

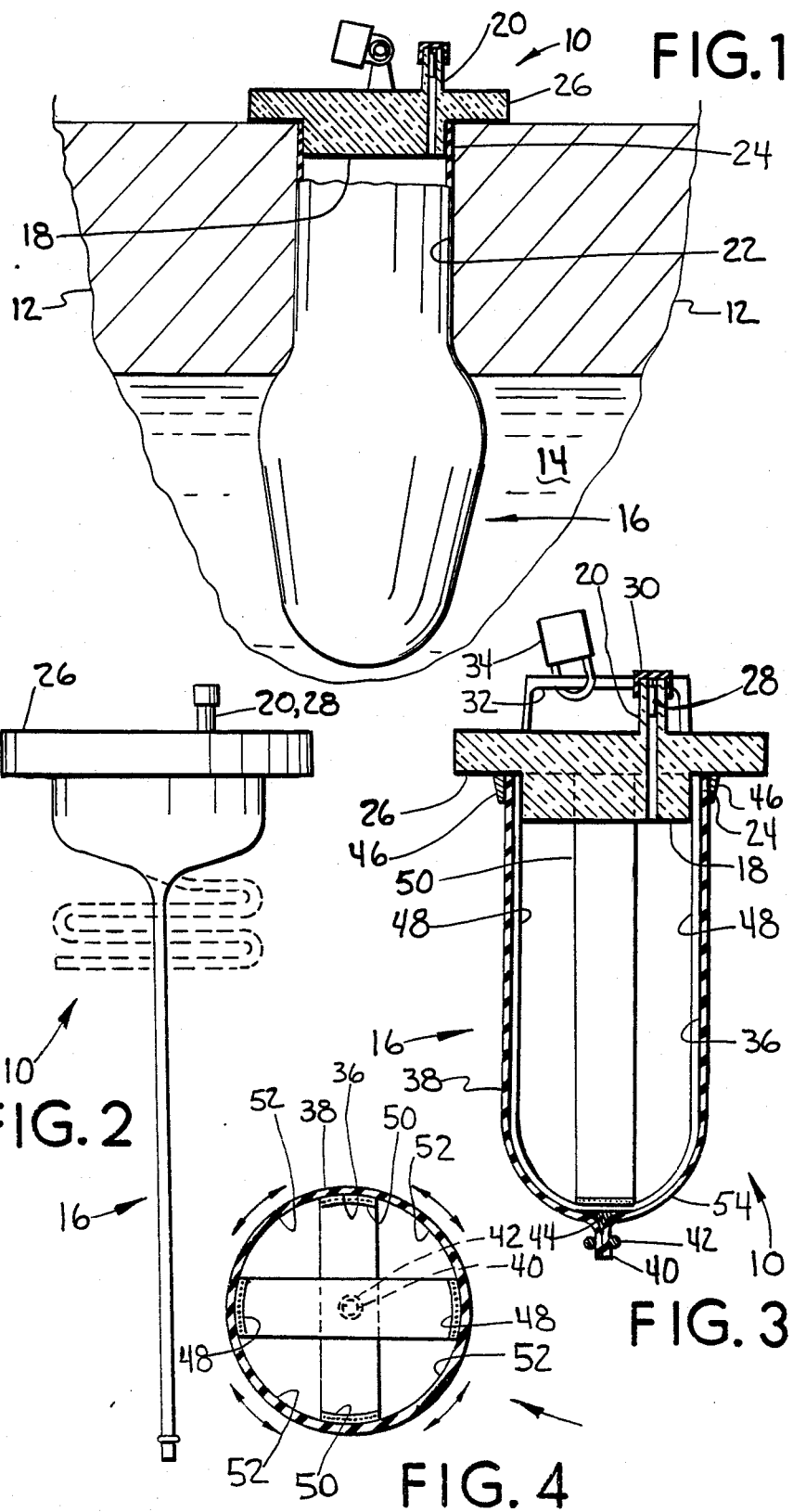

1

METHOD AND APPARATUS FOR MAINTAINING AN OPENING IN OUTDOOR ICE

BACKGROUND OF THE INVENTION

1. Field of the Invention

This invention is a method and an apparatus for maintaining an opening in outdoor ice, particularily during winter on lakes and rivers. The method and apparatus are specifically intended to be utilized in conjunction with ice fishing.

2. The Prior Art

There are several existing methods and devices for keeping a fishing hole open through ice in winter. In ice fishing, the fisherman (inclusive of men, women and children) first makes a hole in the ice. The hole can be made with a manual auger, a power auger, a chisel, or even a chainsaw. The most commonly used technique and tool is the manual auger which makes a perfectly round hole with a diameter which is typically 6, 7 or 8 inches of constant cross section. The technique and tool which requires the least effort is the power auger which typically makes a similar or larger perfectly round hole. The manual auger can be carried anywhere; the power auger usually has to be carried on and supported by a vehicle. The impact ice chisel requires the most effort, and makes a hole of errotic size and cross section. A hole cut by a chainsaw is usually square.

The most popular technique and device is the manual auger, either of a helical screw type or of the "Swedish" type with a spoon shaped cutter. These devices are the least costly, are easy to carry, require less effort than an impact chisel, and makes a nice clean hole through ice of any thinkness. A shaft extender can be used on manual augers and they can quite effectively go through 48 inches of ice.

By virtue of the popularity of the manual auger, the most frequently encountered and utilized fishing hole is a perfect diameter, in the range of 6 to 8 inches in diameter.

Fishermen repeatedly use the same location, be it in the open out on the ice, or in a fish house. They go out, open the hole and go fishing. At the end of the day they leave and may not return for a day, several days or a week. Each time they return they have to re-open the hole. The work is dispised and is considered a necessary evil. There are several devices used to keep fish holes open for short periods of time. The most common is a tapered pail inserted down into the hole and left there to freeze in. When the fisherman returns, the pail is popped out of the hole. Some of these pail devices have heaters. There are several problems with pails. They only work for a relatively short period of time, i.e. overnight. They must be ballasted with removable dry ballast because of natural buoyancy. They break. They freeze in and cannot be removed. They are only available in large diameters, i.e. ice cream and 5 gallon pails, they only work for short depths of up to 18 inches. Ice freezes under the bucket and sill requires some reopening effort.

There is a definite need and want for a method and an apparatus to keep fishing holes open for extended periods of time and through any normally encountered thickness of ice.

OBJECTS OF THE INVENTION

It is an object of this invention to provide a new method and apparatus for keeping an ice hole open, using a bladder which can be pressurized.

It is an object of this invention to provide a new bladder for an ice plug.

It is an object of this invention to provide a new ice hole plug with a bladder.

SUMMARY OF THE INVENTION

A method of maintaining an opening in outdoor ice atop a body of water, has the steps of inserting a deflated bladder into the opening, applying a weight atop of the bladder, inflating the bladder with air while it is weighted, removing the weight from the inflated bladder, and retaining the bladder in the opening with greater than atmospheric internal pressure.

Apparatus for maintaining an opening in outdoor ice has a top plug, an elongate cylindrical bladder having one end secured to the plug and a closure on the other end, an air tube into the bladder, and a selectively openable air valve in the air tube for selective pressurization and de-pressurization of the bladder.

An ice hole plug has an elongate diametrically expandable bladder having longitudinal cording for constraining elongate growth, both ends of the bladder are closed, an air passageway is in one end of the bladder, and an air valve is in the air passageway.

A bladder for an ice plug has an elongate diametrically expandable bladder having longitudinal cording for constraining elongate growth when pressurized, the cording is within an outer surface of the bladder.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

BRIEF DESCRIPTION OF THE DRAWINGS

FIG. 1 is an elevational view showing the method and apparatus of this invention being used to maintain or keep open a hole in outdoor ice atop a body of water;

FIG. 2 is an elevational view showing the apparatus of FIG. 1 in a deflated configuration;

FIG. 3 is an elevational cross-sectional view through the centerline of the apparatus of FIG. 1; and FIG. 4 is a top plan view of the bladder in the apparatus of FIG. 1.

DESCRIPTION OF THE PREFERRED EMBODIMENT

In accordance with the principles of the present invention, an apparatus generally indicated by the numeral 10, is provided for maintaining an opening in outdoor ice 12 atop of a body of water 14 such as a lake or a river. The apparatus will hereinafter be generally referred to as an ice plug 10 and/or ice hole plug 10.

The ice plug 10 has a bladder generally indicated by the numeral 16, a top plug 18 and an air tube 20 for inflation and/or deflation of the bladder 16. The hole or opening 22 in the ice 12 is conventionally cut with an auger and will usually be of 6, 7 or 8 inch nominal diameter. The top plug 18 is rigid and perferrably devised of an icephobic material such as an appropriate thermoplastic, hard elastomer, thermoplastic rubber (TPR) or a rigid structural material having its exterior surfaces coated with an icephobic material.

The top plug 18 is preferrably round, of about 7 inch diameter, and is sized to fit within an otherwise open upper end 24 of the bladder 16. The top plug 18 is provided with a rigid planar top flange 26 which has a larger plan section than the top plug 18 or the unpressurized bladder 16. The top flange 26 prevents the ice plug 10 from falling into or through the opening 22 and also serves another function as will be described. The air tube or passageway 20 extends through the top plug 18 and the bladder upper end 24. Within the air tube 20 is a selectively operable air valve 28 normally covered by a valve cap 30. The exterior part of the air tube 20 may be a conventional vehicle tire stem and the preferred air valve 28 is a Scrader type valve, commonly used on vehicle wheels and tires. The top plug 18 also preferrably has an extraction handle 32 and an owners I.D. or license carrier 34, which may be carried within the top flange 26.

An important part of this invention is the bladder 16 which is shown in detail in FIGS. 3 and 4. The bladder 16 is an elongate and preferrably constant diameter tube 36 of the nominal size of a fishing hole, say 7 inches. The material of the tube 36 is preferrably an elastomer, a TPR material or an extremely flexible thermoplastic film.

The exterior surface 38 of the tube 36 is definitely icephobic. The bottom 40 of the tube 36 is gathered and fluid tightly closed by an appropriate clamp 42 which may be a large casing ring. The gathered bottom 40 may have an internal sealant plug 44. The upper end 24 of the tube 36 is fluid tightly secured to the body 18 by an appropriate structural adhesive and/or mechanical clamp/fastener 46. The gathered lower end 40 has a smaller cross-section than the rigidly fastened upper end 24 of the bladder 16.

Inside of the bladder 16 are a plurality of high modulus elongate longitudinal cords 48, 50 which extend the entire effective length of the inside of the bladder 16. The cords 48, 50 are fastened at the upper ends to the top plug 18 by adhesive and/or mechanical fasteners. The cords 48, 50 are radially spaced from each other as is shown in FIG. 4, and the space between the cords 48, 50 is designated by the numeral 52. The tube 36 is resiliently expandable around its diameter, but is constrained from elongate longitudinal growth by the cords 48, 50. Each of the cords 48, 50 may be a U-shaped cord as clearly shown in both FIGS. 3 and 4, and both ends of each cord 48, 50 may be secured to each other where they cross over at the bladder bottom 40. The entire length of each cord 48, 50 is adhesively fastened to the bladder tube 36. The cords 48, 50 are both inside of the icephobic outer surface 38 of the bladder 16. A preferred diameter of the bladder 16 has been explained as being 7 inches; this gives a bladder circumference of about 22 inches. Each cord 48, 50 is preferrably about 2 inches wide and the four spaced apart upright units of cord 48, 50 cumulatively occupy about 8" of the 22 circumference. The cords 48, 50 occupy a minority of the circumference so that a majority of the circumference is diametrically expandable. A preferred cord 48, 50 occupies less than ½ of the circumference but more than ¼ of the circumference, leaving at least ½ and preferrably closer to ¾ of the circumference as diametrically expandable. In a successfully operated prototype of this ice plug 10, a cord 48, 50 made out of automotive seat belt cording adhesively bonded to the inside of coiled up rubber sheet forming the tube 36, was found to operate completely satisfactorily.

In the operation and use of the ice plug 10 and in the practice of the method of this invention, the hole 22 is cut through the ice preferrably with an auger. When it is desirable to cover the hole 22 and maintain it open during a period of non-use, th ice plug 10, in a relatively deflated state, is placed over the open hole 22. A weight is placed atop of the ice plug; the preferred weight being the fisherman using the ice plug. The top flange 26 prevents the ice plug 10 from going completely into the hole 22 and serves as a platform for the weight thereon. The fisherman then connects an air pump (not shown) to the air tube 20 and begins to pump and inflate up the bladder 16. A preferred air pump is a common manual bicycle pump. As the bladder 16 is being inflated, the soft flexible bottom end 40 goes down into the water 14 and the bladder 16 extends to its full length and full diameter. The pressure it takes to expand the bladder 16 to its full length depends upon the length of the bladder 16. For example, a preferred 4 foot length of bladder 16 requires about 1.8 PSIG to completely inflate the bladder 16. A 7 inch diameter bladder 16 extending 4 feet down into the water 14 displaces about 0.67 pounds of water providing a net buoyancy of about 60 pounds. The weight keeps the ice plug 10 in the hole 22 and in the water 14 against this buoyancy. Further inflation and pressurization of the ice plug 10 diametrically expands the bladder 16 by resiliently stretching the space part 52 of the badder tube 36. As the bladder 16 diametrically expands, it fisrt conforms to the diameter and surface of the hole 22 in the ice 12. The lower part 54 of the bladder 16, i.e. that part of the bladder 16 which is below the ice 12, then diametrically expands to a larger section than the ice hole 22 and assumes somewhat of a fotball shape (a "U.S." football shape) as shown in FIG. 1, and pulls the ice plug 10 down into the hole 22. The ice plug 10 then cannot be removed from the hole 22. The pressurization of the bladder 16 required to achieve this result is amazing, a pressure in the range of 2 to 3 PSIG will achieve the aforesaid result.

The inflated and pressurized ice plug 10 can be left in the hole for short or extended periods of time. The water 14 typically has a temperature of about 45 degrees F. and will convectively keep the air inside the bladder 16 warm enough to prevent further freezing around the bladder 16.

When the fisherman returns to use the hole 22, the air valve 28 is opened and as the bladder 16 depressurizes, the lower part 54 collapses and the bladder outer surface 38 pops off of the ice 12 and the net buoyancy of the ice plug 10 pops it up and out of the hole 22.

This method and apparatus are extremely simple, requires little effort, uses no flammables, can be done by children and seniors, and is quite useful. It also should work extremely well for commercial fishing wherein nets are pulled in and out of spaced apart fish holes, using tether lines.

Although other advantages may be found and realized and various modifications may be suggested by those versed in the art, it should be understood that we wish to embody within the scope of the patent warranted hereon, all such embodiments as reasonably and properly come within the scope of our contribution to the art.

We claim as our invention:

1. A method of maintaining an opening in outdoor ice atop a body of water, comprising the steps of:

(a) cutting an opening through frozen ice atop of a body of water;
(b) inserting a deflated generally cylindrical bladder into the opening;
(c) applying a weight atop of the inserted bladder;
(d) inflating the bladder with air while it is so weighted until the bladder is compressively restrained by the ice;
(e) constraining elongate growth of the bladder during pressurization to above atmosphere, with elongate longitudinal cords within the bladder;
(f) diametrically expanding the bladder with simultaneously constraining elongate growth, and engaging the ice with the expanding diameter of the bladder;
(g) removing the weight from atop the bladder;
(h) retaining the air in the bladder and under greater than atmospheric pressure until such time as access through the opening is again wanted;
(i) deflating the bladder at least partially at such time as access through the opening is again wanted; and
(j) extracting the bladder from said opening after said deflating, whereupon access through the opening and into the water is immediately available without re-cutting the ice.

2. The method of claim 1, in which said inflating is done to a pressure in the range of 1 to 3 PSIG.

3. The method of claim 2, including the step of diametrically expanding a lower end of the bladder in the water and underneath the ice, and pulling the top end of the bladder downward into the opening.

4. The method of claim 3, including the further steps of providing a rigid top plug on the top end of the bladder, and pulling the plug downward into the opening with the bladder during the step of inflating.

5. An ice hole plug, comprising
(a) an elongate diametrically expandable bladder having longitudinal cording for constraining elongate growth of the bladder when under internal pressurization, said cording being within an exterior surface of the bladder;
(b) closure means on both ends of the bladder for fluid tightly closing the bladder ends;
(c) an air passageway into one end of the bladder; and
(d) an air valve in said passageway for selectively admitting and releasing air inside of the bladder.

6. The ice plug of claim 5, in which one end of the double closured bladder has a flexible end and the opposite end of the bladder has a rigid end.

7. The ice plug of claim 6, in which the rigid end is larger than the flexible end.

8. The ice plug of claim 7, in which the air passageway is through the rigid end.

9. The ice plug of claim 5, in which said cording includes a pair of generally U-shaped cords which cross each other at a lower end of the bladder and which are secured to the closure means at the upper end of the bladder.

10. A bladder for an ice plug comprising an elongate diametrically expandable bladder having longitudinal cording for constraining elongate growth of the bladder when under internal pressurization, said cording being within an exterior surface of the bladder, said bladder being devoid of constraining circumfrential hoop cording for diametric expansion without longitudinal expansion during pressurization of the bladder.

11. The bladder of claim 10, in which said longitudinal cording includes at least one generally U-shaped cord having both distal ends at a first open longitudinal end of the bladder, said cord extending the entire length of the bladder, said cord making a 180 degree turn within a closed second longitudinal end of the bladder.

12. The apparatus of claim 10, in which said cording includes a plurality of radially spaced apart cord members, said bladder being diametrically expandable in cross sections between said spaced apart cord members.

13. The apparatus of claim 12, in which said cord members are belted cords which are radially spaced from each other.

14. Apparatus for maintaining an opening in outdoors ice, comprising:
(a) a top plug, said plug being a rigid block;
(b) an elongate cylindrical bladder having an upper end secured to said plug;
(c) means closing a lower end of said bladder for fluid tightly separating the inside and outside of the bladder;
(d) an air tube into an upper end of the bladder;
(e) a pneumatic valve in said air tube for enabling pressurization of the bladder and for enabling selective de-pressurization of the bladder; and
(f) a rigid planar top plug flange of greater plan section than an inflated plan section of the bladder.

15. The apparatus of claim 8, in which said top flange is atop said plug, the inside of said bladder being sealingly secured to the plan perimeter of said plug.

16. Apparatus for maintaining an opening in outdoors ice, comprising:
(a) a top plug;
(b) an elongate cylindrical bladder having an upper end secured to said plug;
(c) means closing a lower end of said bladder, for fluid tightly separating the inside and outside of the bladder;
(d) an air tube into an upper end of the bladder;
(e) a pneumatic valve in said air tube for enabling pressurization of the bladder and for enabling selective de-pressurization of the bladder; and
(f) longitudinal cording between the upper end and the lower end of said bladder for constraining elongate growth of the bladder, said bladder being devoid of constraining circumfrential cording and being diametrically expandable while being longitudinally restrained during pressurization of said bladder.

17. The apparatus of claim 10, in which said cording is secured to the bladder.

18. Apparatus for maintaining an opening in outdoors ice, comprising
(a) a top plug;
(b) an elongate cylindrical bladder having an upper end secured to said plug;
(c) means closing a lower end of said bladder, for fluid tightly separating an inside and an outside of the bladder;
(d) an air tube into an upper end of the bladder;
(e) a pneumatic valve in said air tube for enabling pressurization of the bladder and for enabling selective de-pressurization of the bladder;
(f) longitudinal cording between the upper end and the lower end of said bladder for restraining elongate growth of the bladder, said cording being secured to said plug.

19. The apparatus of claim 10, in which said cording includes a plurality of radially spaced apart cord members.

20. The apparatus of claim 19, in which said bladder is expandable in cross section, between said spaced apart cord members.

21. The apparatus of claim 10, in which said cording is within an outer surface of said bladder.

22. The apparatus of claim 18, in which said cording extends downward from said plug to a bottom end of the bladder, said cording being fastened to said bladder bottom end.

23. A bladder for an ice plug comprising an elongate diametrically expandable bladder having longitudinal cording for constraining elongate growth of the bladder when under internal pressurization said cording being within an exterior surface of the bladder, said cording including at least one generally U-shaped cord having both distal ends at a first open longitudinal end of the bladder, said cord extending the entire length of the bladder, said cord making a 180 degree turn at a closed second longitudinal end of the bladder, and in which the second end is closed to the outside of the U-shaped cord.

24. A bladder for an ice plug comprising an elongate diametrically expandable bladder having longitudinal cording for constraining elongate growth of the bladder when under internal pressurization said cording being within an exterior surface of the bladder, in which the cording includes a plurality of belted cords, said belted cords being radially spaced from each other.

25. The bladder of claim 24, in which said belts occupy a minority of the sectional circumference of the bladder.

* * * * *